United States Patent [19]

Nelken

[11] 4,425,671
[45] Jan. 17, 1984

[54] ELECTRICAL COMBUSTION TOILET

[76] Inventor: Ewald Nelken, Elbestr. 21, 4330 Mülheim (Ruhr), Fed. Rep. of Germany

[21] Appl. No.: 253,059

[22] Filed: Apr. 10, 1981

[30] Foreign Application Priority Data

Apr. 14, 1980 [DE] Fed. Rep. of Germany ....... 3014244
Nov. 25, 1980 [DE] Fed. Rep. of Germany ....... 3044377

[51] Int. Cl.³ .............................................. A47K 11/02
[52] U.S. Cl. ........................................ 4/111.3; 4/111.5
[58] Field of Search ...................... 4/449, 111.1, 111.2, 4/111.5, 476, 477, 347, 306, 316–323, 111.3, 111.4, 111.6, 300; 200/302; 110/242, 237, 194, 346; 98/50, 115 LH; 219/377, 354, 359; 73/431; 299/12; 169/64

[56] References Cited

U.S. PATENT DOCUMENTS

| 2,753,002 | 11/1953 | Hoevels ................................ 169/64 |
| 3,139,626 | 7/1964 | Blankenship ......................... 4/111.2 |
| 3,169,497 | 2/1965 | Blankenship ......................... 4/111.2 |
| 3,725,963 | 4/1973 | Speer .................................... 4/111.4 |
| 3,792,230 | 2/1974 | Ray ...................................... 219/354 |
| 3,943,579 | 3/1976 | Blankenship ......................... 4/111.5 |
| 4,122,557 | 10/1978 | Harris .................................. 4/111.1 |

FOREIGN PATENT DOCUMENTS 745700 10/1953 United Kingdom ................ 219/377

Primary Examiner—Stephen Marcus
Assistant Examiner—Kenneth S. Putnam
Attorney, Agent, or Firm—Toren, McGeady and Stanger

[57] ABSTRACT

An electrical combustion toilet including a housing having a seat and a cover, a first receiving chamber for receiving toilet wastes, a combustion chamber situated below the first receiving chamber adapted to receive wastes therefrom by force of gravity and to electrically incinerate the wastes, an ash chamber for receiving combustion residue from the combustion chamber, and a fireproof cover adapted to seal the combustion chamber. The toilet is rendered firedamp-proof by an encapsulation structure and by being supplied with pressurized air for preventing explosive gas mixtures.

1 Claim, 7 Drawing Figures

ELECTRICAL COMBUSTION TOILET

The present invention relates generally to waste disposal apparatus and more particularly to a toilet which operates to dispose of human waste materials by electrical incineration thereof.

The toilet to which the present invention relates is of the type comprising a toilet housing having a seat thereon with a first receiving chamber for toilet wastes being located below the seat. A seat cover is provided and a combustion chamber having an ash compartment is located below the first receiving chamber, the combustion chamber being sealed with a fireproof cover and being arranged to receive waste products from the first receiving chambr by force of gravity.

Combustion toilets of the type which may be utilized in camping trailers, vacation homes or the like are known for example from U.S. Pat. No. 3,943,579. This combustion toilet is utilized in particular for private use and in places where sufficient quantities of water are difficult to supply or where the incident fecal matter can only be disposed of with difficulty. For operation of such combustion toilets, it is only necessary to provide electrical power. The incident waste is heated to a sufficiently high temperature by an appropriate heating coil so that it is burned or incinerated to ashes. The combustion gases which are formed are transported to the exterior of the device through a filter by means of a blower.

The ashes which are produced are environmentally non-polluting and thus electrical combustion toilets are found to be superior to chemical toilets.

The features of electrical combustion or incinerating toilets are found particularly favorable in underground mining, particularly in coal mines from the point of view of the sanitary conditions which prevail and there has for a long time existed a need to afford adequate sanitary facilities for underground mine workers. However, in some cases, open fecal buckets has been prevalent, such buckets being located at the pithead of the mine and being transported usually by a person employed solely for this purpose to an above ground location where they may be cleaned and then returned below ground. This method is not only uneconomical but is also unhygienic to a high degree.

Accordingly, the present invention is directed toward the task of creating a solution to the aforementioned problems and to providing adequate sanitary facilities below ground, particularly adapted for use in hard coal pits whereby a toilet need not be fixed at a particular stationary installation point but may rather in accordance with its purpose be transported at any given time to the pithead.

SUMMARY OF THE INVENTION

The present invention is particularly directed toward the construction of an electrical combustion toilet which may be rendered firedamp-proof wherein the firedamp protection is particularly achieved by encapsulation means which are supplied with compressed air.

Briefly, the invention may be described as an electrical combustion toilet comprising a housing having thereon a seat and a cover for the seat, a first receiving chamber for receiving toilet wastes, a combustion chamber situated below the first receiving chamber adapted to receive the wastes therefrom by force of gravity and to electrically incinerate such wastes, an ash chamber for receiving combustion residue from the combustion chamber, a fireproof cover adapted to seal the combustion chamber and encapsulation means supplied with pressurized air for rendering the toilet firedamp-proof.

The invention enables the achievement of allowing installation of an electrical combustion toilet at any time at the pithead of a mine without the occurrence of particularly dangerous firedamp explosions wherein a mixture of atmospheric air and methane, in appropriate proportions of 91 percent air to 9 percent methane may be ignited by minor ignition sources such as for example sparks which may be caused by electrical appliances, exhaust flames from internal combustion engines, cigarettes or other similar potential ignition means.

In mining methods in use today, there is not only available sufficient electrical power at the pithead but also compressed air at any time for operation of the mining equipment or conveying devices. Thus, a firedamp-proof toilet constructed in accordance with the invention may be readily connected to a compressed air supply network and thus will render it possible to perform unimpeded operation of sanitary installations equipped in such a manner.

In accordance with a specific feature of the invention, all of the electrical units necessary for operation of the toilet are arranged, along with the combustion chamber, within the housing which is closed during the combustion process, the housing being constructed in such a manner that it can be permeated by compressed air by means of a pressurized air inlet line and a pressurized air outlet line. As a result of this special encapsulation of the parts which are exposed to the danger of explosion, it is possible to provide a smaller structure of the combustion toilet, with the compressed air flowing therethrough effecting constant exchange of air in contact with the electrical units in such a manner that unfavorable mixture proportions will not exist. This applies also in particular to the combustion chamber which is also permeated by the compressed air.

In a further specific aspect of the invention, the toilet is arranged within an encapsulated cabin or room equipped with pressurized air supply. Such a construction may be arranged wherever stationary installations are possible, for example in repair shops below ground, in loading or unloading installations and the like.

In a further specific aspect of the invention, there is provided at least one fuse element which in the event of a cutoff in the pressurized airflow will interrupt the supply of electrical current to the toilet. Also, there may be provided at least one fuse element such that during transfer of the toilet waste from the first chamber into the combustion chamber the supply of electrical current is interrupted. Such measures may for instance take the form of weathervane switches within the compressed air line or they may be switches activated by pressure cylinders registering pressure drop during compressed air cutoff. Alternatively, there may be provided sensor switches which register temperature change resulting from cutoff in the compressed air supply, which as a rule is colder relative to the surrounding underground environment.

In accordance with a further feature of the invention, the pressurized air inlet for the sealed combustion chamber having the ash compartment may be in the form of an approximately circular flushing tube with pressurized air outlet openings for flushing the air from the combustion chamber. As a result of this feature, it has been found possible to provide a combustion toilet with functionally safe elements and with compact construction providing adequate sanitary underground servicing particularly in hard coal pits and to confine the firedamp-proofing feature to the combustion chamber.

It is essential with regard to the firedamp proofing feature that there be created a firedamp free atmosphere in those areas wherein they may arise temperatures which could lead to ignition of an explosive mine gas mixture which could occur in areas where there may exist sparks, incandescent elements or the like. Thus, the invention overcomes this danger in a relatively simple manner in that the essential parts of the combustion toilet are constructed in such a way as to be supplied by compressed air thus creating necessary conditions before the onset of a combustion process by providing the combustion chamber with an atmosphere which is totally free of mine gas and which may be achieved by connection to the actual pressurized air system of the mine itself.

Of substantial importance also is the provision of a forced flow of flushing air through a catalyzer and a corresponding catalyzer chamber construction effected by a double-chamber design of the combustion chamber wall since with such construction an odor free and bacteria free operation of the toilet is possible in any location.

In order to adapt the toilet for use to corresponding underground mining operations and to achieve the most versatile application of the equipment, the invention provides for automatic emptying of the ash compartment. Due to a further specific feature of the invention, a special construction is provided which permits the formation of vortex streams in the ash chamber and the blowing away of germ free and odor free ashes in the manner of a cyclone to the exterior of the apparatus, for example into the environment or into an ash sack.

It is also a feature of the invention that during operation of the combustion heating unit all elements at those locations which may come in contact with mine gas have a temperature substantially lower than the ignition temperature, preferably in the range below 200° C. In a combustion toilet in accordance with the present invention this is achieved through a pressurized air cooling system of all the elements involved, and through special structural features provided in accordance with more specific aspects of the invention.

In accordance with a specific operating cycle of the combustion toilet of the invention intended particularly for use underground, particular flushing times of the combustion chamber are provided which achieve with reliability an exclusive non-ignitable atmosphere in the combustion chamber. If the combustion chamber is already filled with fecal matter there occurs prior to the onset of the combustion process a renewed flushing by means of a forced flow of the flushing air. Odor pollution of the environment is reliably prevented by the catalyzer layer.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
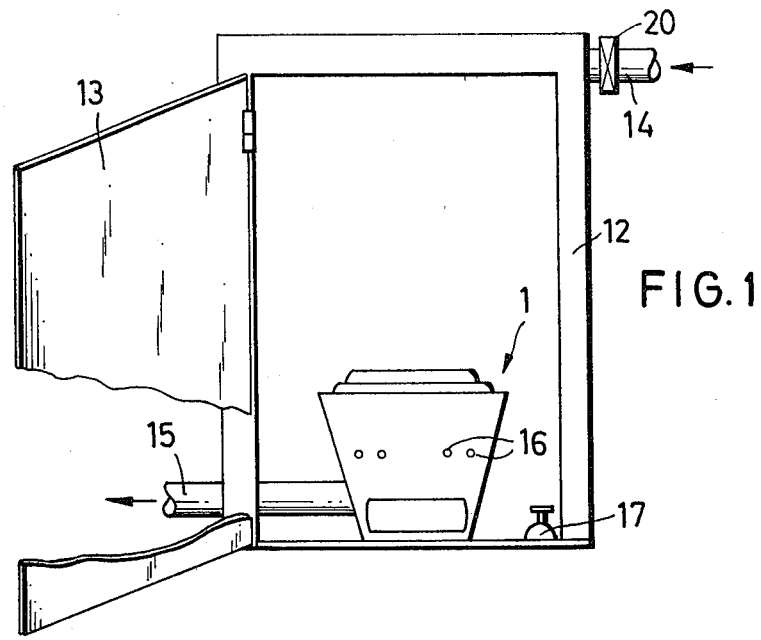
FIG. 1 is a schematic elevation showing a combustion toilet located within a toilet compartment or room.

Referring now to the drawings, an electrical combustion toilet in accordance with the present invention is depicted therein which is generally referred to by the reference numeral 1 and which consists essentially of a seat 2 and a housing 4 upon which there is supported a cover 3. A funnel shaped receiving chamber 5 is provided for toilet wastes, the chamber 5 in the operating position being lined as a rule with a paper bag or the like designed for the specific purpose indicated, this not being represented in detail in the drawings.

Below the receiving chamber 5 there is provided a combustion chamber 6 having an ash compartment 7, the chamber 6 being situated below the chamber 5 to receive therefrom waste materials by force of gravity.

Figure 2:
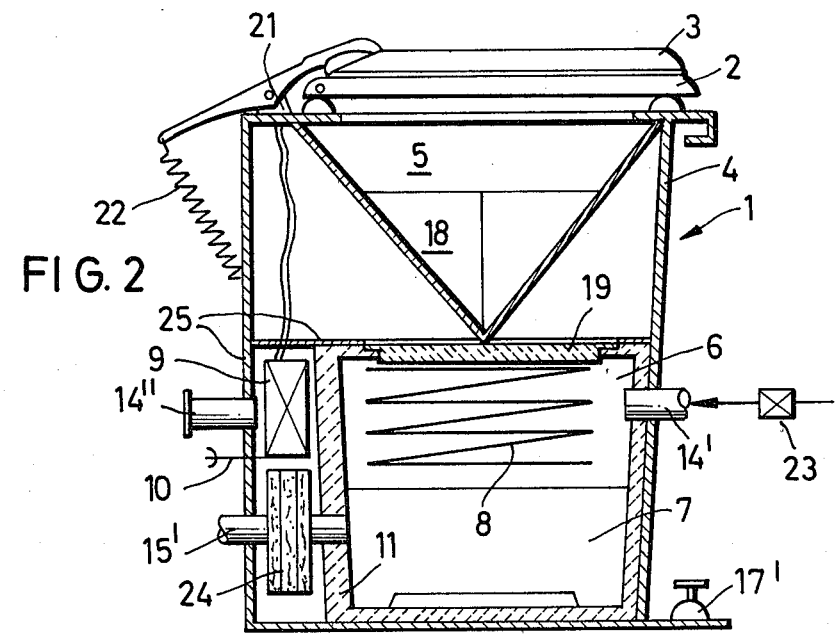
FIG. 2 is a sectional view of a combustion toilet in accordance with the invention shown in a simplified representation.

Combustion of the waste materials is effected by a heating coil 8 which is supplied from a switch and fuse box 9 with electrical power from an electrical supply system. In FIG. 2, the electrical connection line is designated by reference numeral 10 and is represented only in a very simplified manner. The combustion chamber is enveloped with a heat insulating jacket 11 of fireproof material, for example asbestos.

An installation utilizing a combustion toilet in accordance with the invention is represented in FIG. 1. In the installation shown in FIG. 1, the combustion toilet 1 is arranged within a toilet room or enclosure 12 having a door 13 shown in the opened position. The door 13 is structured to close in an airtight manner the enclosure 12 and to be moved by a door closure mechanism not shown in detail. The enclosure 12 is equipped with a compressed air supply line 14 and with a compressed air outlet line 15, the supply line 14 being arranged in the ceiling area of the enclosure or room 12 with the air outlet line exhausting from the housing of the toilet 1 and being directed exteriorly thereof through a wall of the enclosure 12.

In FIG. 2, air inlet and outlet lines for different embodiments of the invention are designated by reference numerals 14' and 15', respectively.

In order to insure access into the housing of the toilet 1 by the compressed air flowing through the supply line 14, there may be provided additional entrance openings 16. A foot switch 17 which may operate to activate, among other things, the opening of funnel elements 18, the pivoting away of a fireproof cover 19 which seals shut the combustion chamber, and the commencement of the combustion process, is represented only in a simplified form. Instead of the switch 17 there may also be provided hand switches, pedal switches or the like.

Safety elements may be provided which, for example, register and account for cut-off in the compressed air supply. Such a safety element may take the form of a switch 20 in the compressed air inlet line 14, the switch 20 operating to completely cut off electrical power supply to the toilet 1 in the event of a termination in the flow of compressed air. Additionally, there may be provided a further switch for example in a hinge 21 of the cover 3. The cover 3 is generally biased in the closing direction by the action of a pressure spring 22. A further switch could be provided at this point in order to interrupt electrical power supply to the toilet when the cover 3 is opened thereby terminating quickly a combustion process which may have been initiated during a recent previous use of the toilet. Thus, after a renewed activation of the foot switch 17 and opening of the combustion chamber, the heating coil 8 will be cooled sufficiently with respect to the surrounding air so that it will fall below critical ignition temperatures preventing the possible ignition of mine gases which may be present. The cooling of the heating coil is further speeded by the constant stream of compressed air.

For this purpose, the pressure spring 22 for closing of the cover 3 is set in such a way that the cover will be automatically closed after a few minutes in the event that a user having already left the toilet accidentally neglects to close the cover. The combustion process in the combustion chamber 6 begins again only after the cover 3 has been completely closed, with the combustion chamber once again being completely closed by the cover 19. The combustion chamber 6 is permanently permeated by compressed air so that explosive mine gas mixtures cannot be present therein.

A pressure reduction valve may be provided before the entrance of the compressed air either into the toilet enclosure 12 or into the toilet 1 in order for example to transform compressed air from an operating pressure of 5 bars down to 1 bar.

In addition to the safety measures described, it will be seen particularly from FIG. 2 that all of the electrical units which are necessary for operation of the toilet and which are only referred to herein for the sake of clarity by way of example with reference numeral 9, together with the heating coil 8, are situated within an encapsulation 25 permeated by compressed air. A further compressed air inlet 14" is provided independently of the compressed air inlet 14' into the combustion chamber operating additionally to flood all of the outer units with compressed air. The exhaust may in turn occur through an outflow line 15' with the interposition of, for example, an active filter 24.

Figure 3:
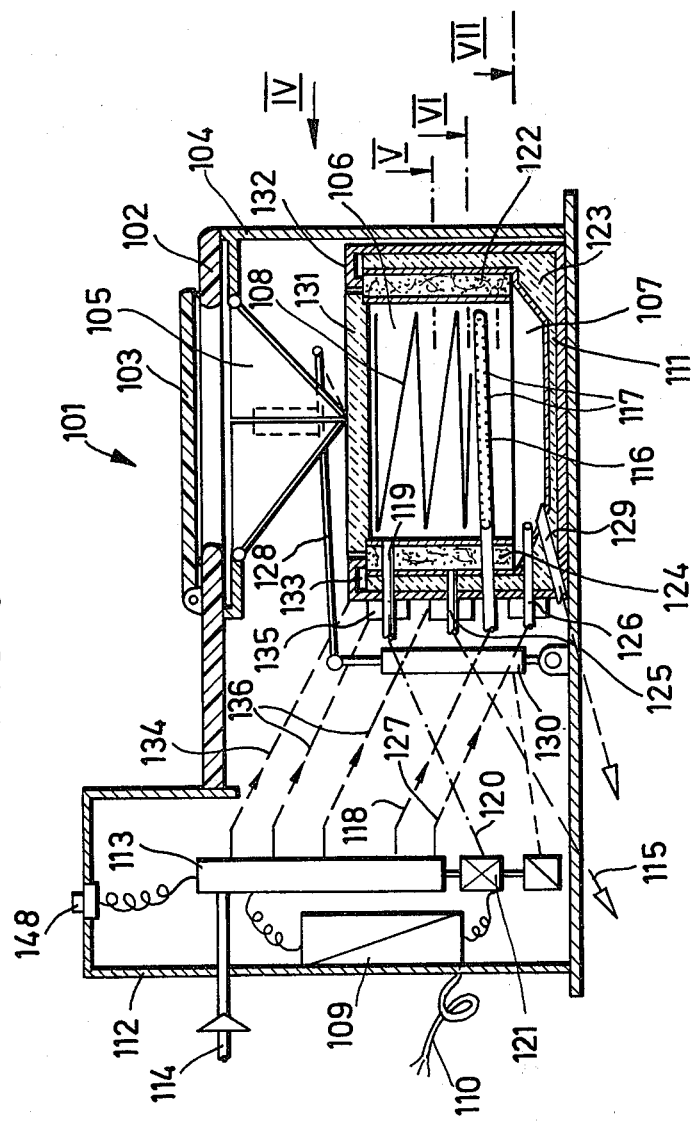
FIG. 3 is a sectional view of an electrical combustion toilet in accordance with a modification of the invention again shown in simplified form.
Figure 4:
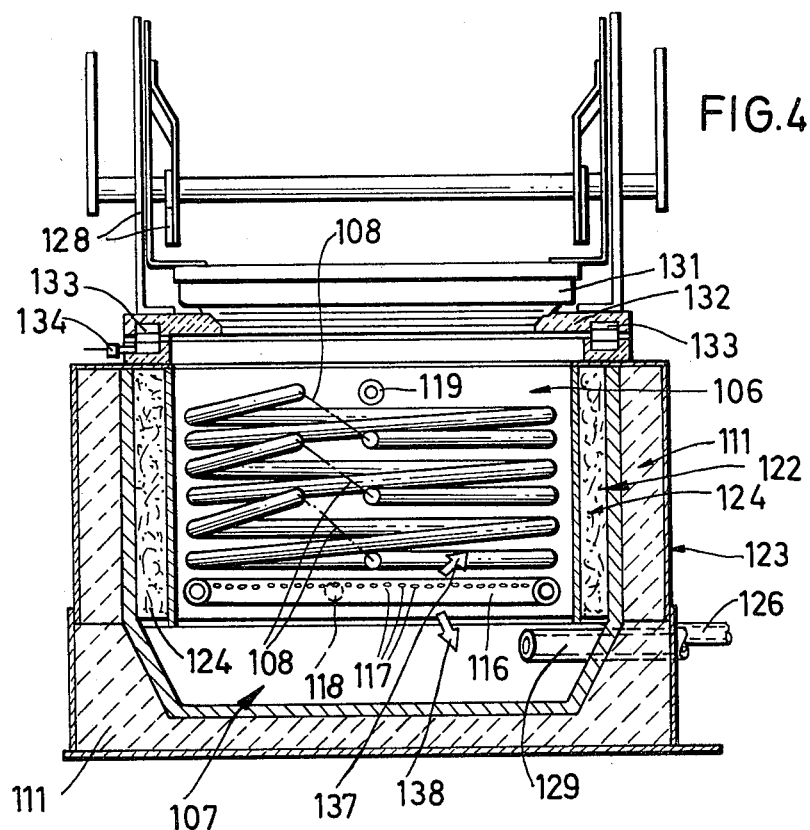
FIG. 4 is a sectional elevation of a combustion chamber with an ash compartment as seen in the direction of the arrow IV of FIG. 3.

A further modified embodiment of the invention is represented in FIGS. 3–7. As shown in FIG. 3, a switch and control cabinet 112 is provided alongside a housing 104 of a combustion toilet 101. The cabinet 112 is designed to contain the entire pneumatic control system 113 for the toilet and all of the electrical switching elements necessary for operation, with all of these parts being represented in a very simplified manner. A pressurized air intake line 114 leads into the control cabinet 112 and the entire pneumatic control system 113 is activated therefrom. A pressurized air exhaust line 115 is shown in a simplified manner leading exteriorly or into a separate pressurized air cycling system (not shown). As best seen in FIG. 4, the device is provided with three heating coils 108 having a respective power of 12 Watts at 320 Volts and in the lower area of the heating chamber there is also provided an annular pressurized air flushing tube 116 having a large number of pressurized air exhaust openings 117. The exhaust openings are positioned in such a way that a portion of the openings enables flushing air to flow into the upper area of the combustion chamber 106 as indicated by the arrow 137 in FIG. 4 while others of the openings allow flow of flushing air into the ash compartment 107 as indicated by arrow 138 in FIG. 4. An intake line 118 is provided for the pressurized air to the flushing tube 116.

A pressure tube 119 connected by means of a pressurized air line 120 to a heat overload fuse 121 is provided in the upper area of the combustion chamber. The fuse 121 is of the type which may melt when the temperature exceeds about 800° C. in order to interrupt the entire energy supply to the electrical combustion toilet.

As will be readily seen from FIG. 3, the wall of the combustion chamber 106 is structured essentially as a double chamber having an inner chamber 122 and a concentrically arranged outer chamber 123. Within the inner chamber 122 there is provided a filling 124 of catalytic material while in the outer chamber heat insulation 111 is provided.

The pressurized air outlet line 115 is provided at an outlet nipple 125 which projects into the area of the inner chamber 122.

Into the ash compartment 107 there protrudes a pressurized air inlet pipe 126 which is supplied over a line 127 by the control system 113 by means of pressurized air. A pressurized air outlet 129 functioning as an ash blowout nipple leads from the ash compartment to the exterior of the device and the individual functions of the elements will be described in greater detail hereinafter.

The combustion chamber 106 is closed off by a cover which is activated by a lever system 128 (not represented in detail in FIG. 3) and by a pneumatic cylinder 130. The edge or flange area 132 of the combustion chamber in the area of the cover 131 is provided with a circular line 133 through which pressurized air may be conducted by means of a line 134 for cooling of this area.

As will be indicated from FIG. 3, all of these lines leading to the combustion chamber or to the ash compartment are provided in their respective areas in the immediate vicinity of the combustion chamber with cooling chambers 135 which may be cooled by means of lines 136 by means of pressurized air.

Figure 5:
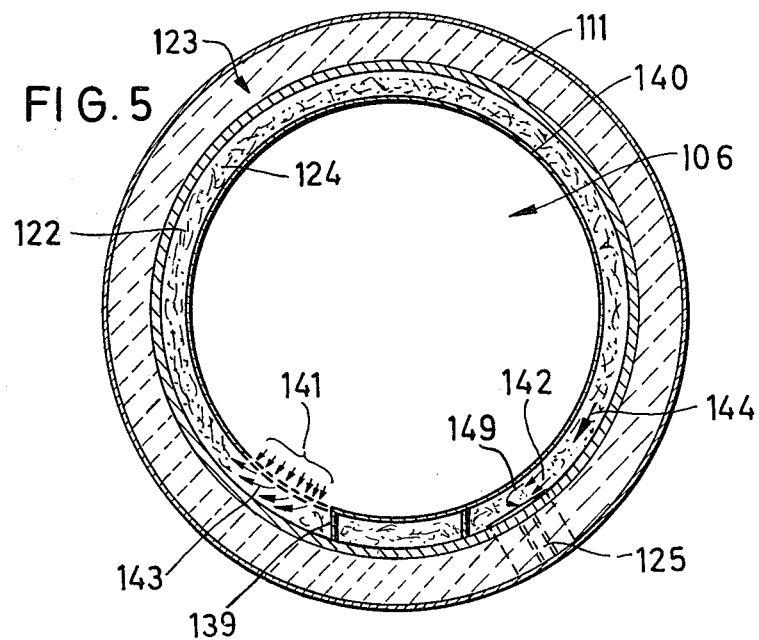
FIGS. 5 to 7 are horizontal sectional views taken respectively through the combustion chamber of the toilet along planes indicated by the arrows V, VI and VII in FIG. 3.

In FIGS. 4–7, individual features are represented in detail, in particular with regard to the combustion chamber 106 and the ash compartment 107. As will be seen from FIG. 5, the inner chamber 122 which receives the catalytic material is equipped with a partition wall 139 extending approximately perpendicularly. The inner chamber wall 140 facing the combustion chamber 106 is equipped with a large number of entrance openings 141 provided in the area of this partition wall 139 for the flushing air blown in through the flushing tube 116. An opening 142 shown in FIG. 5 is provided from the catalytic material. This opening directly feeds the outlet pipe 125 for the spent air. This embodiment achieves a forced flow of the flushing air in the direction of the arrows 143 through the catalyst and then out of the catalyst in accordance with the arrow 144 and into the spent air pipe according to arrow 149. As a consequence of these construction features, the flushing air is forced to flow through the entire catalyst chamber 122 thereby affording optimal use of the catalyst.

A similar circular ring conduction of cooling air in the flange area 132 of the combustion chamber is not represented in detail in the drawings.

A ring or annular channel 133 for the cooling air is also equipped for the forced flow of cooling air by means of a perpendicular wall. The cooling air enters into the ring groove 133 via a line 134 and exists just in front of or before the plane of the drawing according to FIG. 4 out of an exit, not shown in detail. Between the entrance 134 and the exit (not shown in detail) there is provided the partition wall which is also not shown in detail.

Figure 6:
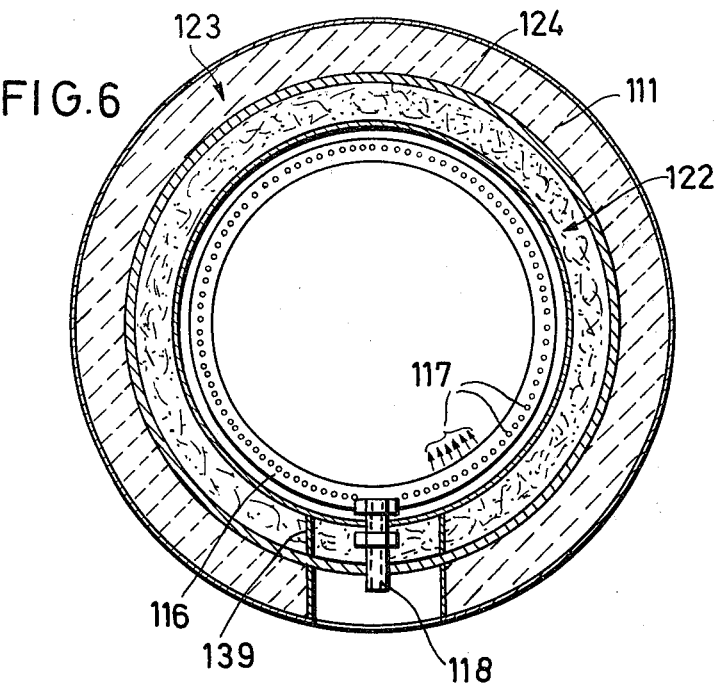

The flushing tube 116 with the pressurized air entrance 118 is represented in somewhat better detail in FIG. 6 wherein the position of bores 117, for reasons of clarity, are not represented in the upwardly inclined position nor particularly in the downward position. Rather, this follows also in connection with FIG. 4.

Figure 7:
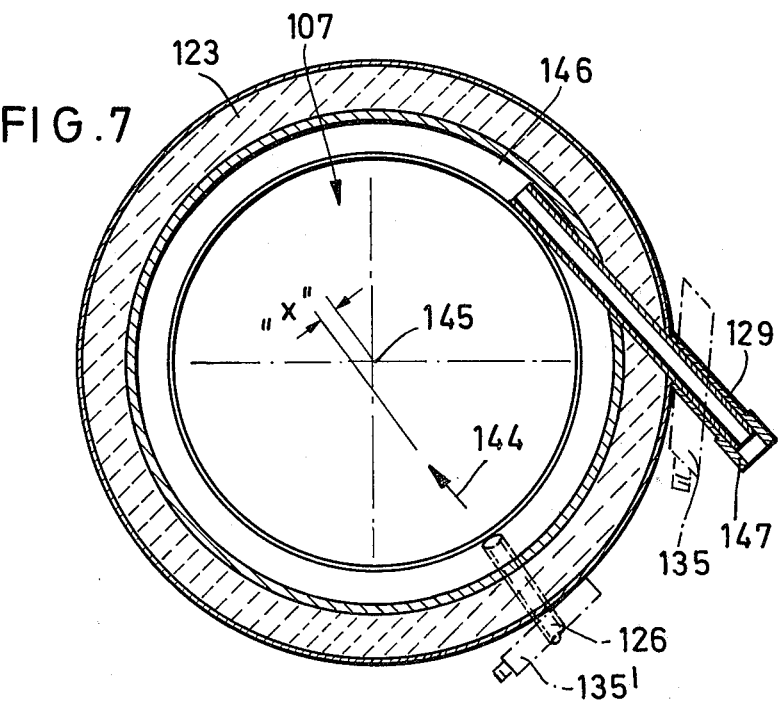

Finally, there is represented in FIG. 7, the lower ash compartment area, particularly the position and arrangement of the air pressure inlet 126. The air pressure stream entering in the direction of the arrow 144 is not conducted exactly toward a median perpendicular 145 of the ash compartment 107, but rather is offset sideways with regard to this median by an amount indicated as "x". The pressurized air outlet 129 is arranged in the area of the inner wall, designated by 146, of the ash compartment and conducts the spent air in a tangential direction out of this chamber to the exterior. As will be seen in FIG. 7, a vortex stream is generated in the ash compartment during the blowing in of the pressurized air in the direction of the arrow 144 whereby the blown in pressurized air stream is conducted eccentrically to the central point of the chamber, the vortex being directed to the exterior by means of the blowout pipes 129. By the action of the vortex, the ash located in the ash compartment is directed to the outside over the blowout pipe. At the blowout pipe 129 there is provided a device 147, for example, an external thread so that there may be attached thereto an ash sack or the like.

As will also be seen from FIG. 7, all of the blow in and blowout pipes connected to the heat chambers are cooled by pressurized air by means of outer cooling chambers 135 for which process this pressurized air can be connected in series and later on may be used by being blown in as preheated flushing air. Alternatively, the pressurized air may be connected separately each time in accordance with the operating conditions of the combustion toilet.

In the operation of the electrical combustion toilet of the invention, before the toilet is to be placed in use, a paper bag or other covering material is placed into the funnel chamber 105 thereby preventing soiling of the walls of the toilet which operates completely without the use of water or liquid. After use of the toilet, a switch 148 is activated thereby to commence the total operating cycle of the toilet.

Initially, the combustion chamber and the ash compartment are flushed for a limited period of time, for example for two minutes, with flushing air which enters through the ring conduit 16 and exists through the pipe 118 after passing through the catalyst. Thereafter, the cover 131 of the combustion chamber is hydraulically pivoted sideways automatically by means of the lifting rod 128 and the funnel elements holding the fecal bag are pivoted open so that the fecal bag falls into the combustion chamber. Upon closing of the cover 131 of the combustion chamber 106, the combustion chamber is again flushed with pressurized air, for example for three minutes. This is done due to the fact that during the opening and closing of the combustion chamber cover, mine gases may flow into the combustion chamber. Because of the forced conduction of the flushing air through the catalyst, the possibility of odor pollution of the environment is avoided.

Upon completion of the flushing process, the heating elements are energized while at the same time a slight excess pressure in the combustion chamber is maintained by flushing with flushing air. Upon completion of the combustion process which may last for about 15 minutes, the heating element is de-activated and the combustion chamber with the ash compartment is again flushed by pressurized air for a limited time.

Subsequently, removal of the ash from the ash compartment occurs by conduction of pressurized air to the blow-in pipe 126. The cyclone vortex carries the completely dry and bacteria free ash located in the ash compartment through the blowout pipe 129 for instance to an ash sack.

All switching operations of the combustion toilet occur over pneumatic and/or electronic switching devices. For pneumatic control there are provided for short time periods pneumatic short-time elements and for longer switching times, volume-time elements and for long switching times pressurized air-activated timers, all of which are not represented in details of the drawings.

Of course, the embodiment described may be modified in many aspects without departing from the basic concepts of the invention. In particular, the invention is not limited to any particular conduction of all of the cooling systems. Aside from the represented direct cooling systems of the heat sensitive parts of the installation, there may also occur indirect cooling for example through the provision of cooling veins and blowing by means of pressurized air. Aside from the fully automatic emptying of the ashes from the ash compartment, there may also be provided a manual emptying since the invention is not limited to the preferred pneumatic control. Similarly, electronic elements may be used. If further electrical and possibly fire damp endangered switching elements are used inside the combustion toilet, these may also be constructed within their own encapsulation which will be flushed by pressurized air.

While specific embodiments of the invention have been shown and described in detail to illustrate the application of the inventive principles, it will be understood that the invention may be embodied otherwise without departing from such principles.

What is claimed is:

1. An electrical combustion toilet comprising a housing having a seat and a cover for said seat, a first receiving chamber for receiving therein toilet wastes, a combustion chamber situated below said first receiving chamber adapted to receive wastes from said first receiving chamber by force of gravity and to electrically incinerate said wastes, an ash chamber for receiving combustion residue from said combustion chamber, a fireproof cover adapted to seal said combustion chamber, encapsulation means enclosing said combustion chamber and said ash chamber supplied with pressurized air for rendering said toilet firedamp-proof, said combustion chamber and said ash chamber being constructed in such a way as to be permeable by pressurized air by means of a pressurized air inlet line and a pressurized air outlet line, said pressurized air inlet line feeding an approximately circular flushing tube having pressurized air outflow openings for flushing air arranged in said combustion chamber, said toilet further comprising switching means for starting activation of said electrical combustion toilet and for starting flow of pressurized air therein, means for effecting limited-time flushing of said combustion chamber and of said ash chamber by means of said pressurized air through said circular flushing tube, means for opening said combustion chamber cover and for simultaneously effecting dropping of waste matter into said combustion chamber with subsequent closing of said cover, means for effecting renewed time-limited pressurized air flushing, means for switching on activation of heating elements in said combustion chamber and for time-limited activation of said heating elements under slight excess pressure by maintaining a passage of flushing air, means for switching off said heating elements, means for time-limited after-flushing by means of pressurized air, means for time-limited blowing-out of ash from said ash chamber by means of pressurized air and means for switching off said pressurized air.

* * * * *